United States Patent
Prasad et al.

(10) Patent No.: US 12,448,272 B1
(45) Date of Patent: *Oct. 21, 2025

(54) SYSTEM AND METHOD FOR MANAGING A FUEL DISPENSING ACCOUNT

(71) Applicant: United Services Automobile Association (USAA), San Antonio, TX (US)

(72) Inventors: Bharat Prasad, San Antonio, TX (US); Charles L Oakes, III, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 999 days.

This patent is subject to a terminal disclaimer.

(21) Appl. No.: 17/519,733

(22) Filed: Nov. 5, 2021

Related U.S. Application Data

(60) Continuation of application No. 16/152,529, filed on Oct. 5, 2018, now Pat. No. 11,192,773, which is a
(Continued)

(51) Int. Cl.
| | |
|---|---|
| *B67D 7/34* | (2010.01) |
| *B60R 25/24* | (2013.01) |
| *B60R 25/25* | (2013.01) |
| *B67D 7/04* | (2010.01) |
| *G06Q 20/40* | (2012.01) |
| *G06Q 50/06* | (2024.01) |

(Continued)

(52) U.S. Cl.
CPC .............. *B67D 7/348* (2013.01); *B60R 25/24* (2013.01); *B60R 25/25* (2013.01); *B67D 7/04* (2013.01); *G06Q 20/40* (2013.01); *G06Q 50/06* (2013.01); *G07F 13/025* (2013.01); *G07F 15/001* (2013.01)

(58) Field of Classification Search
CPC .......... B67D 7/348; B67D 7/04; B60R 25/24; B60R 25/25; G06Q 20/40; G06Q 50/06; G07F 13/025; G07F 15/001
See application file for complete search history.

(56) References Cited

U.S. PATENT DOCUMENTS

| | | | | |
|---|---|---|---|---|
| 6,098,879 | A | * | 8/2000 | Terranova ............. G07F 7/1008 235/380 |
| 6,882,900 | B1 | | 4/2005 | Terranova |

(Continued)

OTHER PUBLICATIONS

P Fleet, https://web.archive.org/web/20120623004456/https://www.pfleet.com/fleet-cards (Jun. 23, 2012). (Year: 2012).*

*Primary Examiner* — Elizabeth H Rosen
(74) *Attorney, Agent, or Firm* — BakerHostetler

(57) ABSTRACT

Described herein are systems and methods for managing a fuel dispensing account associated with fuel dispensing transactions. Aspects of such systems and methods include receiving, from a user device associated with a primary user account, a fuel request to dispense requested fuel, wherein the fuel request is received by a receiver of a fuel dispensing device; and if authorization exists from the primary account for the fuel request, instructing the requested fuel to be dispensed from the fuel dispensing apparatus, or if authorization does not exist from the primary account, instructing the request to be refused by the fuel dispensing apparatus.

16 Claims, 4 Drawing Sheets

Related U.S. Application Data division of application No. 14/689,747, filed on Apr. 17, 2015, now Pat. No. 10,131,531.

(60) Provisional application No. 61/991,783, filed on May 12, 2014.

(51) Int. Cl.
*G07F 13/02* (2006.01)
*G07F 15/00* (2006.01)

(56) References Cited

U.S. PATENT DOCUMENTS

| | | | | |
|---|---|---|---|---|
| 8,912,924 | B2 | 12/2014 | Scofield et al. | |
| 2004/0225613 | A1* | 11/2004 | Narayanaswami | G07F 7/1025 |
| | | | | 705/64 |
| 2008/0221743 | A1* | 9/2008 | Schwarz | G06Q 30/06 |
| | | | | 701/2 |
| 2010/0280956 | A1* | 11/2010 | Chutorash | G07F 13/025 |
| | | | | 705/64 |
| 2012/0197793 | A1* | 8/2012 | Grigg | G06Q 20/40 |
| | | | | 705/41 |
| 2013/0246171 | A1* | 9/2013 | Carapelli | G06Q 20/325 |
| | | | | 705/14.51 |
| 2014/0085110 | A1* | 3/2014 | Scofield | G07B 15/04 |
| | | | | 340/5.4 |
| 2014/0351138 | A1* | 11/2014 | Frieden | G06Q 50/06 |
| | | | | 705/44 |

\* cited by examiner

SYSTEM AND METHOD FOR MANAGING A FUEL DISPENSING ACCOUNT

CROSS REFERENCE TO RELATED APPLICATIONS

This application is a continuation application which claims priority to U.S. Ser. No. 16/152,529, filed Oct. 5, 2018, which claims priority to U.S. patent application Ser. No. 14/689,747, filed Apr. 17, 2015, which claims priority to U.S. Patent Application Ser. No. 61/991,783 filed May 12, 2014, all of which are incorporated herein by reference in their entirety.

BACKGROUND

This invention relates generally to systems for dispensing fuel, and in particular to intelligent fuel dispensing systems.

Conventional fuel dispensers permit customers to dispense fuel into customer vehicles. The fueling process follows traditional steps and includes stopping a customer vehicle in near proximity to a fuel dispenser (e.g., a pump), opening a fuel port of the vehicle (e.g., a gasoline tank), selecting a fuel grade or type, dispensing fuel into the vehicle, and payment. Additional steps can be included as necessary depending on, for example, payment type, etc.

However, conventional fuel dispensers do not provide additional services or any enhanced experience to the customer. The present invention is directed to providing additional services and/or an enhanced fueling experience over existing fuel dispensing systems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, provided is a method and system for managing a fuel dispensing account. The method and system includes managing a fuel dispensing account associated with fuel dispensing transactions, wherein the account is further associated with one or more vehicles, and/or at least one primary user and one or more secondary users.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
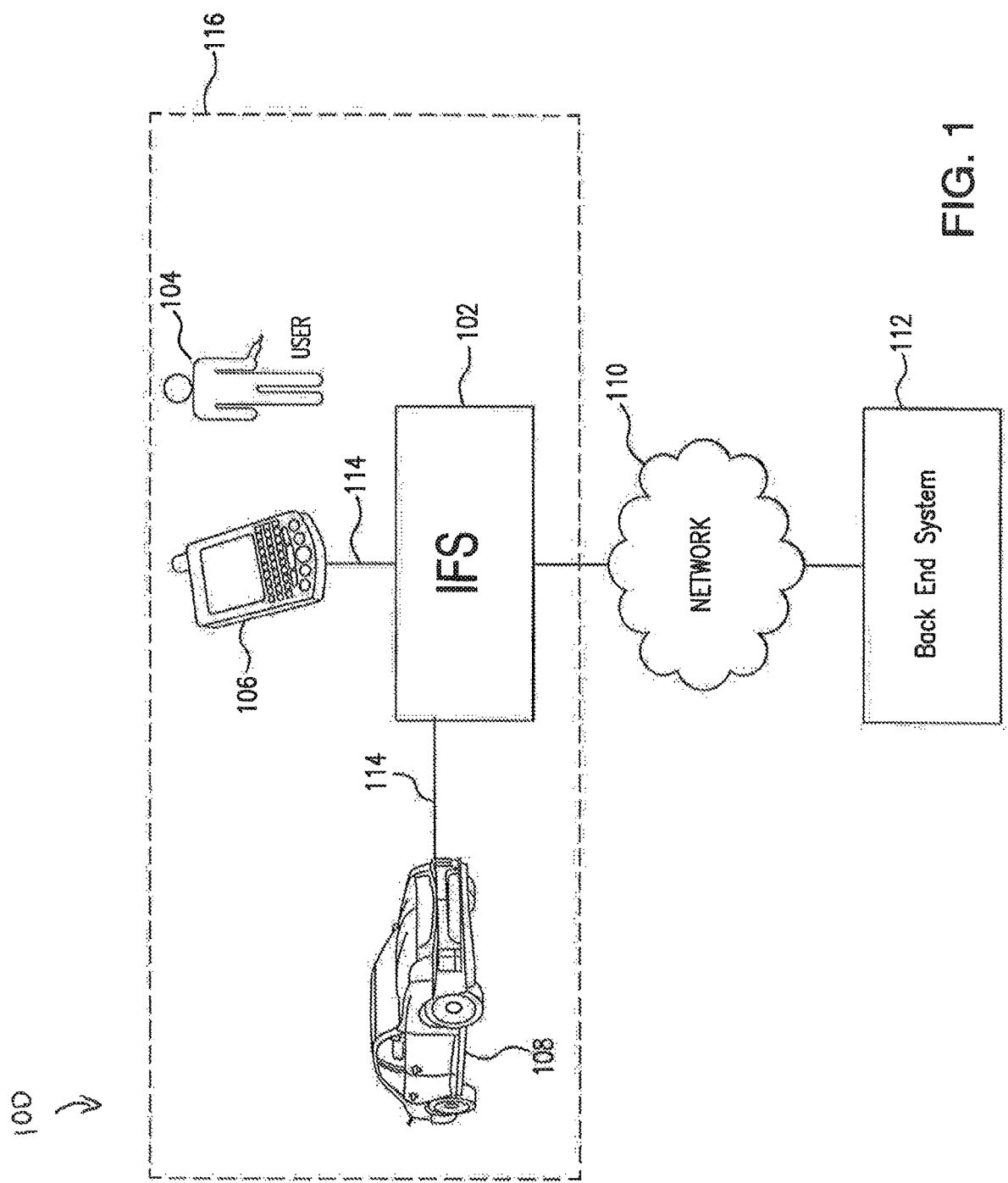
FIG. 1 depicts an integrated fuel dispensing terminal system, in accordance with an embodiment of the present invention.

The present invention is directed to system and method for managing a fuel dispensing account at a fuel dispensing apparatus. The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the above-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

This application is related to and hereby incorporates by reference in their entirety the following: U.S. Application Ser. No. 61/750,668; filed Jan. 9, 2013 and U.S. application Ser. No. 13/920,548, filed Jun. 18, 2013; U.S. Application Ser. No. 61/661,027 filed on Jun. 18, 2012; and U.S. application Ser. No. 12/500,742, filed on Jul. 10, 2009.

Referring to FIG. 1, an embodiment of system 100 is shown for illustrative purposes. In one example, system 100 comprises an Integrated Fueling Station IFS 102 in the form of a fuel dispenser operatively connected to a back end system 112 over a network 110. The IFS 102 is configured to provide one or more fuel dispensing transactions to one or more users 104. It is contemplated herein that IFS 102 may include gasoline dispenser, electrical battery charger, solar battery replacement, and/or any energy transfer mechanism as is or will be recognized by those skilled in the art. It is further contemplated that users of fuel dispensing services may have an account associated with fuel dispensing services. Users might be able to open such accounts, referred to hereinafter as fuel dispensing accounts, with their financial institutions, insurance companies, fuel service providers, and the like. In various embodiments fuel dispensing accounts may be associated with particular users, users' vehicles and/or any combination thereof. In some cases fuel dispensing accounts may be associated with one or more primary users (i.e. account managers) and one or more secondary users. In such cases primary users might be interested in receiving notifications regarding fuel dispensing account usage. Furthermore, at least in some embodiments, primary account users might need to authorize at least some of the fuel dispensing transactions. Various embodiments of the present invention are directed to a system which includes an IFS, such as IFS 102 configured to facilitate management of a fuel dispensing account.

In one embodiment, user 104 may initiate communication with the IFS 102 by utilizing a mobile device 106 to send information to IFS 102. In alternative embodiment, user 104 may initiate communication with the IFS 102 by utilizing a smart device, such as a computer, integrated with the vehicle 108. Such user initiated communication may comprise a request to conduct a fuel dispensing transaction. In yet another embodiment IFS 102 might be configured to detect the presence of either users or vehicles associated with the fuel dispensing account by employing geofencing techniques described below. In this implementation, IFS 102 might initiate one or more fuel dispensing transactions automatically upon the detected presence of a user or a vehicle associated with the fuel dispensing account. According to one embodiment of the present invention, the IFS 102 may interact with the back end system 112 in order to complete a user's authentication and/or to complete a payment transaction associated with the fuel dispensing account.

Embodiments described herein contemplate an electronic device ("smart device" not shown in FIG. 1) that can be connected to an on-board diagnostics (OBD) port of a vehicle 108 and provide access to vehicle's 108 data interface operatively coupled to vehicle's 108 central processing module. Such an electronic device is referred to herein as an "OBD device". In one embodiment, the OBD device may include an OBD II-compliant diagnostic PC tablet. The OBD device may include a wireless transceiver for communicating with various external devices located in the vicinity of the vehicle 108. Via the wireless transceiver and while coupled to the OBD connector of the vehicle 108, the OBD device can provide various information, including authentication information, related to the vehicle 108 and/or driver, such as user 104, as described below. Notably, the OBD device can be manufactured in compliance with guidelines implemented by the fuel dispensing service provider such that the fuel dispensers, such as IFS 102 can be assured of the controlled access of the authentication information, which may be transparent to the user 104. In this way, the authentication information can be accessed by the fuel dispensers even while users, i.e. user 104, are away from their vehicle 108. It is to be understood however that illustrated embodiments are not to be limited upon reliance of such OBD devices for IFS 102 to retrieve vehicle data, as it is contemplated IFS 102 may directly communicate with a vehicles central data interface 108. In such an embodiment, the vehicle central data interface 108 is preferably configured to include communication hardware and software (e.g., a bluetooth, NFC or the like transceiver) adapted to communicate with an IFS 102.

IFS 102 may communicate with user's 104 mobile device 106 and/or vehicle 108 (e.g., OBD device) via one or more wireless links 114. Moreover, embodiments of the present invention contemplate communication methods that facilitate establishing an ad-hoc network between two or more devices for the purpose of connectivity there between. In one embodiment, the IFS 102 can employ provisioning data related to a particular device that it is to be connected securely to. In one embodiment, IFS 102 can invoke such provisioning data through a near field communication (NFC) link 114, wherein the NFC link 114 is a secure, short proximity, and encrypted link capable of being a trusted medium. It is to be appreciated that the encryption utilized can be a handshake (e.g., 4 way handshake) to establish a secure link on top of 'an "open" NFC channel. It is noted that IFS 102 communication with user's mobile device 106 and/or vehicle 108 are not limited to NFC link by any means. For example, after the provisioning data is exchanged with the IFS 102, it can establish another type of wireless connection. Various embodiments of the present invention contemplate that IFS 102 may obtain authentication information from the mobile device 106 and/or vehicle 108 with any suitable wireless connection 114 such as, but not limited to, a wireless local area network (WLAN), Bluetooth, wireless fidelity (Wi-Fi), ultra-wideband (UWB), audio frequency, and the like. Embodiments of the present invention may additionally include secure pairing mechanisms and/or protocols, such as a secure token entry, bar code/QR code optical capturing device or the like enabling a vehicle 108, and IFS 102 and a mobile device 106 to be securely paired with one another during a transaction.

In addition, to perform various account management operations, IFS 102 in one embodiment communicates with one or more back end system 112 through network 110. It is to be appreciated that network 110 depicted in FIG. 1 may comprise any network system known in the art, such as a Local Area Network (LAN), Storage Area Network (SAN), Intranet, Wide Area Network (WAN), a personal area network (PAN), and/or any combination thereof. LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. It is to be appreciated that the illustrated wireless 114 and network 110 connections of FIG. 1 are exemplary and other means of establishing a communications link between multiple devices may be used.

Referring further to FIG. 1, fuel dispensing system 100 includes one or more back end system 112. Back end system 112 in one example includes the electronic systems that facilitate transactions associated with the fuel dispensing account at IFS 102. In one embodiment, back end system 112 comprises the servers and computers of an institution that maintains fuel dispensing accounts. It is to be appreciated that the back end systems 112 may comprise a "cloud system" whereby servers are remotely located from the IFS 102 and communicate thereto via a network, such as the Internet. Financial institutions for supporting the IFS 102 transactions are also communicatively coupled to the "cloud based" servers if a back end system 112.

In some cases, a financial institution may offer an expedited fuel dispensing service to certain clients/members, which may include various purchase programs, such as, but not limited to, remote purchases of fuel, pre-purchases, and the like. Since at least some accounts may have multiple users associated therewith, receiving proper authorization from primary users either before or during fuel dispensing transaction becomes paramount. Therefore, the financial institution maintaining fuel dispensing accounts may request all users associated with such fuel dispensing accounts to provide information that may authenticate their identity for a transaction. Such authentication information may include, for example, but not limited to, biometric information. Accordingly, in one embodiment, such authentication information may be securely stored in the back end system 112 associated with said financial institutions.

It should be understood that each back end system 112 comprises one or more computing devices. A computing device generally includes at least one processor, at least one interface, and at least one memory device coupled via buses. Computing devices may be capable of being coupled together, coupled to peripheral devices, and input/output devices. Computing devices may be standalone devices, but are not limited to such. Each can be coupled to other devices in a distributed processing environment. In some embodiments, back end system 112 may comprise a data storage enterprise system.

As previously indicated, geofences can be used on a location-aware mobile devices to detect when a user of the mobile device enters a specific location, such as a specific integrated fueling station. Geofences can be defined in terms of Global Positioning System (GPS) coordinates (e.g., latitude and longitude) combined with a radius measured in meters or feet, for example. Alternatively, geofences can also be defined according to a series of GPS coordinates defining a bounding box. In yet other examples, a geofence can be any geometric shape defined by a mathematical formula and anchored by a GPS coordinate.

FIG. 1. illustrates a geofence 116 around IFS 102. Geofence 116 can be defined as a perimeter or boundary around IFS 102. Geofence 116 can be as simple as a radius around IFS 102 defining a circular region around the IFS 102 location. Even though in FIG. 1 geofence 116 has a rectangular shape, it is noted that geofence 116 can be any geometric shape. Geofence 116 can be used to assist IFS 102 in determining whether the user 104 (or mobile device 106 or vehicle 108 associated with the fuel dispensing account) is within a geographic area of IFS 102 to provide access to a group fuel dispensing account. If the user 104 is within the geofence 116 established by provisioning of a fuel dispensing account, the system discussed herein can use that information to determine user's privileges and to get authorization for performing fuel dispensing transactions.

Figure 2:
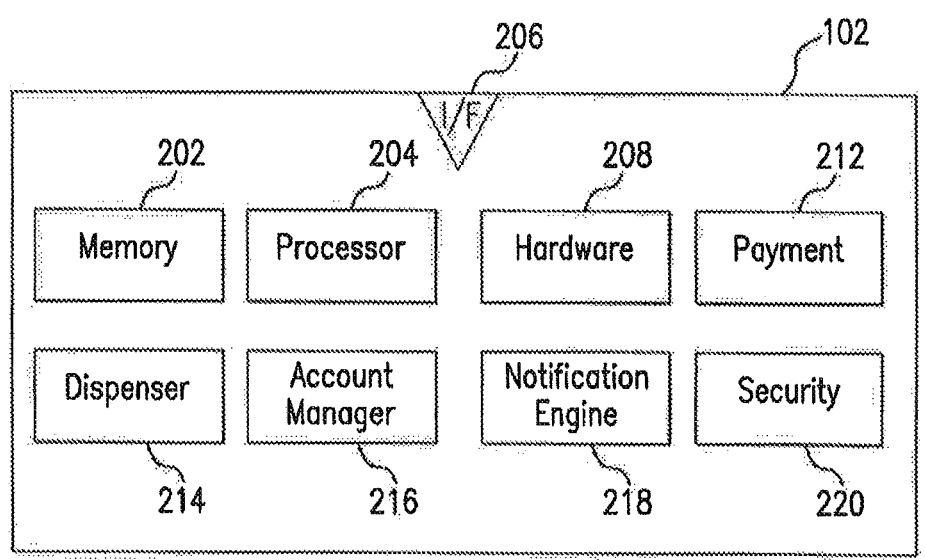
FIG. 2 is a block diagram illustrating an exemplary integrated fuel dispensing terminal of FIG. 1, according to some embodiments of the present invention.

Referring to FIG. 2, a block diagram of IFS 102 is now provided for illustrative purposes. In one embodiment, IFS 102 includes at least one memory 202, at least one processor 204, at least one data interface 206, and IDT hardware 208.

Memory 202 is a computer-readable medium encoded with a computer program. Memory 202 stores data and instructions that are readable and executable by processor 204 for controlling the operation of processor 204. Memory 202 may be implemented as a random access memory (RAM), a read only memory (ROM), solid state storage devices, magnetic devices, a hard drive, or a combination thereof.

Processor 204 is an electronic device comprising logic circuitry that responds to and executes instructions. The processor 204 may comprise more than one distinct processing device, for example to handle different functions within IFS 102. Processor 204 outputs results of execution of the methods described herein. Alternatively, processor 204 could direct the output to a remote device (not shown) via network 110.

Data interface 206 may include the mechanical, electrical, and signaling circuitry for communicating data over network 110 and over wireless links 114. Interface 206 may be configured to transmit and/or receive data using a variety of different communication protocols and various network connections, e.g., wireless and wired/physical connections. However, it should be noted that the view used herein is merely for illustration. Interface 206 can further include an input device, such as a card reader, a radio-frequency identification (RFID) reader, a quick response (QR) code reader, keyboard, video capabilities, a touch screen or a speech recognition subsystem, which enables a user (e.g., user 104) to communicate information and command selections to processor 204. Interface 206 can also include an output device such as a display screen, a speaker, a printer, etc. Interface 206 can further include an input device such as a touch screen, a mouse, track-ball, or joy stick, which allows the user 104 to manipulate the display for communicating additional information and command selections to processor 204. Through utilization of interface 206, IFSs 102 are capable of being coupled together, coupled to peripheral devices, and/or input/output devices. IFS 102 is represented in the FIGS. 1-2 as a standalone device, but is not limited to such. Each IFS 102 may be coupled to other IFSs 102 in a distributed processing environment, such as over one or more LANs and/or WANs (e.g., the Internet).

IFS hardware 208 comprises the physical hardware necessary to provide fuel dispensing service at IFS 102. For instance, if IFS 102 were to include gasoline dispenser functionality, IFS hardware 208 would include the physical pump hardware to pump gas into an automobile (pump, dispenser, cradle, etc.). If IFS 102 were to include electrical battery charging functionality, IFS hardware 208 would include the physical hardware necessary to transfer electricity to a battery in the vehicle 108.

Referring further to FIG. 2, IFS 102 includes a number of engines to provide the expedited fuel dispensing functionality at IFS 102. The term "engine" is used herein to denote a functional operation that may be embodied either as a stand-alone component or as an integrated configuration of a plurality of subordinate components. An engine may be implemented as a single module or as a plurality of modules that operate in cooperation with one another. An engine may be implemented as software stored in memory 202 and executing on processor 204 or in a distributed computing environment an engine could be located and executed across multiple locations, including remote locations, such as data storage enterprise system, including cloud storage system. Further, an engine may also be implemented in any of hardware (e.g., electronic circuitry), firmware, software, or a combination thereof.

For exemplary purposes, IFS 102 may include payment engine 212, dispenser engine 214, account managing engine 216 (referred to hereinafter as "account manager"), notification engine 218 and security engine 220.

Payment engine 212 provides the functionality through which a user can pay for a product at IFS 102 by utilizing their fuel dispensing account. In one embodiment, payment engine 212 may include functionality to allow a primary user to pre-pay and or pre-authorize certain transaction types for certain secondary users. In another embodiment, payment engine 212 may include functionality to allow an authenticated secondary user to pay through utilization of an application (e.g. thin client), operating on the client mobile device 106 and communicating with IFS 102 through interface 206. In various embodiments, the client mobile device 106 may comprise smart phone, tablet, Google Glass®, smart watches, or any mobile computing device as would be recognized by those skilled in the art. In another embodiment, payment engine 212 may include functionality for a primary or secondary user of fuel dispensing account to pay (either before, after, or while the user is at IFS 102) through an application operating on the mobile device 106 or on the OBD device integrated with the vehicle 108 and communicating with back end system 112. Payment engine 212 could then engage with back end system 112 to complete the transaction. For instance, payment engine 212 could ask back end system 112 if secondary user's fuel dispensing account provides "pay later" option in which funds can be transferred from user's account after the secondary user has left IFS 102. Also, payment engine 212 could verify that the user's fuel dispensing account is up to date, prior to engaging in a fuel dispensing transaction.

Dispenser engine 214 may provide the functionality for IFS 102 to dispense fuel/energy to users on site (e.g., gasoline, electricity, and the like). In one example, dispenser engine 214 includes fuel dispenser functionality. Such functionality may include, but is not limited to, tabulating the amount of fuel dispensed, safety mechanisms (e.g. automatic shut off), and sensing whether the pump handle is in its cradle. For instance, removal of the pump handle could serve as a prompt to begin user authentication process. Another safety sensor could be comparing the speed with which the fuel is being dispensed to the speed with which the vehicle is being refilled (e.g., if 1.2 gallons per second are being discharged, but only 1.1 gallons per second are being placed in the vehicle's fuel tank, such may indicate the dangerous condition that some is being spilled so the fuel dispensing should stop). Further, it is contemplated herein that a disparity between the fuel discharge rate and the refueling rate may indicate that the fueling station is corrupt and/or malfunctioning.

In some embodiments, account manager 216 may be configured to implement account access management services and transaction notification services described below in conjunction with FIG. 5. For example, account manager 216 may provide verification of transaction pre-approval, may obtain authorization for a pending transaction in real-time from primary account users, and/or may provide notifications to primary users regarding fuel dispensing account usage. In this way, in some examples, primary account holders, such as account managers, may be able to monitor locations what users/vehicles associated with the target fuel dispensing account are engaged in what types of transactions at what times. By authenticating all users and/or vehicles engaged in fuel dispensing transactions at IFS 102, account manager 216 may make it possible to keep users/vehicles from unauthorized access to fuel dispensing account or otherwise acting maliciously without going unnoticed. It is to be further appreciated that in the scenario where a primary account user is not able to authorize a certain transaction with a specific time period, preferably via a default setting, the account manager 216 is configured and operable to provide a limited pre-authorization for the transaction, which default setting is preferably user prescribed. For instance, regardless of the transaction request, the account manager 216 is only able to authorize three (3) gallons or ten dollars ($10) of fuel.

In an embodiment of the present invention, IFS 102 may include a notification engine 218 adapted to provide notifications/alerts related to fuel dispensing account usage based at least in part on primary user preferences. For example, consider a scenario where a vehicle associated with the fuel dispensing account is driven by an unauthorized user or stolen and the account manager 216 detects the vehicle's presence in the vicinity of IFS 102 and determines that there is a request from an unauthorized user to purchase 20 gallons of fuel for such a vehicle. Currently, owners' of the vehicle would not be immediately aware of such transaction. Advantageously, notification engine 218 may address this situation by notifying one or more primary account holders of the pending transaction and timeframe associated with the transaction. As another example, primary users of the fuel dispensing account may desire to be notified of all fuel dispensing transactions in order to determine certain trends in fuel dispensing account usage. These trends may, in turn, be used to determine a trend indicative of a potential malicious activity, for example.

Security engine 220 may also be involved in various communication schemes described herein, for example, to encrypt/decrypt information. In addition, if user authentication fails and/or if any other predetermined security breach has been detected with respect to a vehicle associated with the fuel dispensing account, security engine 220 may disable the vehicle, and/or may perform any additional security related actions described herein.

Figure 4:
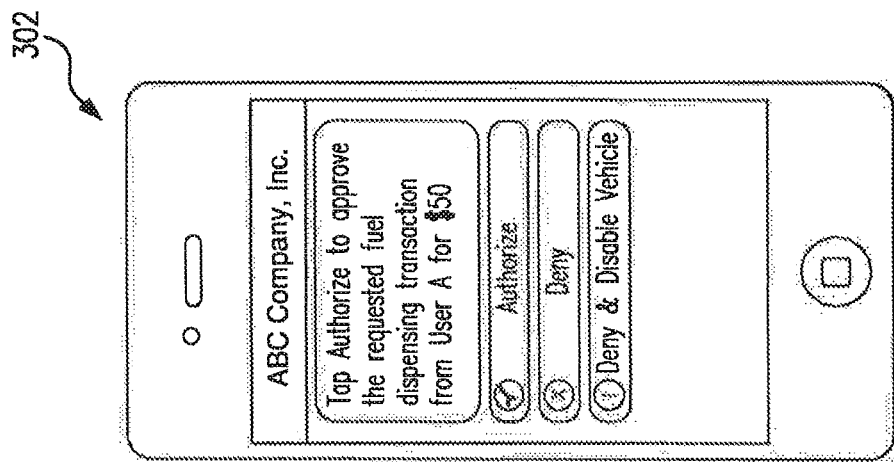
FIG. 4 is depicts another device of a primary user receiving an authorization request, according to another embodiment of the present invention.
Figure 5:
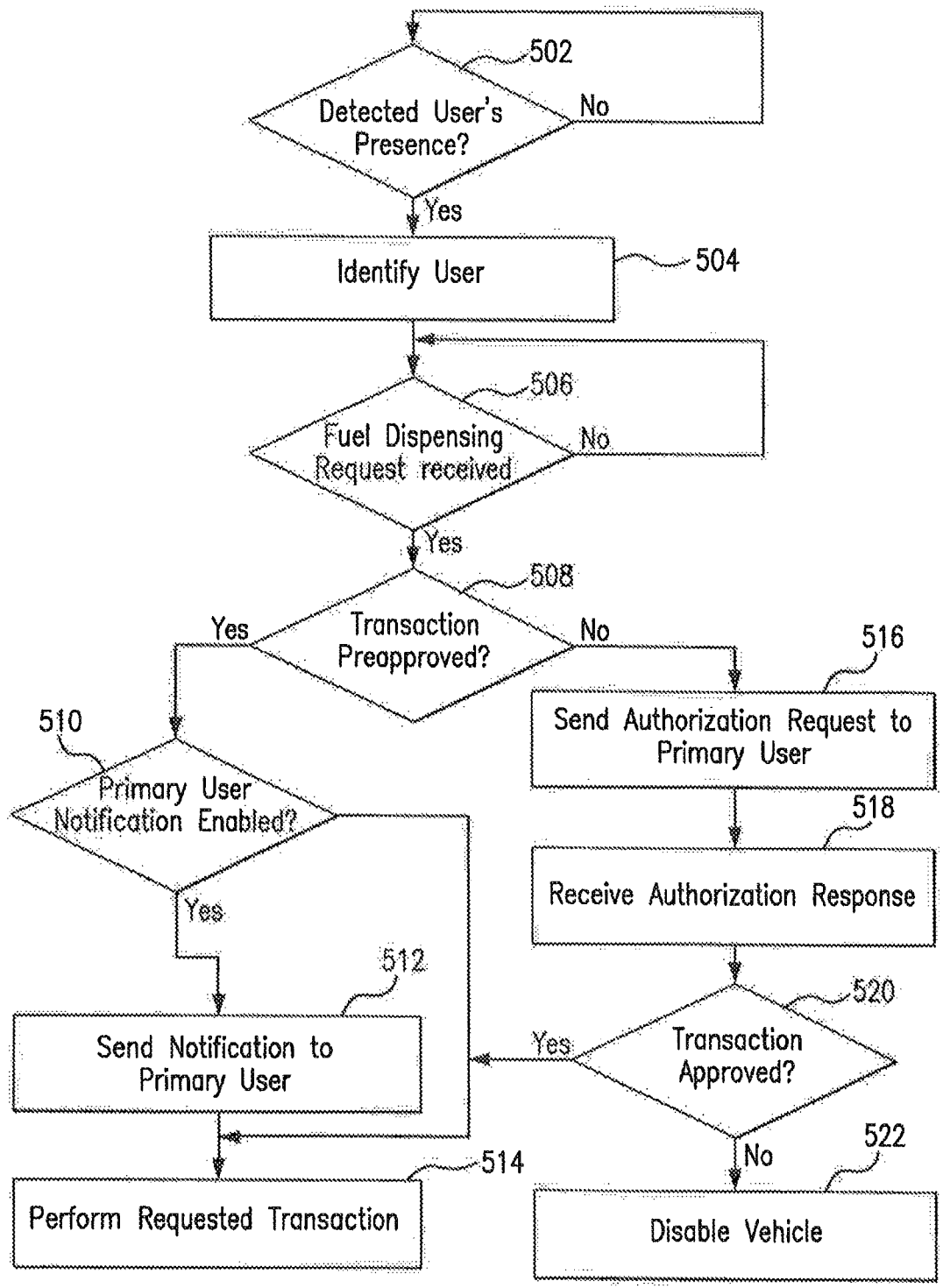
FIG. 5 is a flowchart of operational steps of the account manager module of FIG. 2, in accordance with an illustrative embodiment of the present invention; and A component or a feature that is common to more than one drawing is indicated with the same reference number in each of the drawings.

FIG. 5 is flowchart of operational steps of the account manager 216 of FIG. 2, in accordance with exemplary embodiments of the present invention. Before turning to description of FIG. 5, it is noted that the flow diagram shown therein is described, by way of example, with reference to components shown in FIGS. 1-4, although these operational steps may be carried out in any system and are not limited to the scenario shown in the aforementioned figures. Additionally, the flow diagram in FIG. 5 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

Account manager 216 can receive the detection of the presence of a user 104, mobile device 106 and/or vehicle 108 associated with the fuel dispensing account in step 502. In some embodiments, the mobile device 106 and/or vehicle 108 associated with the account may signal their presence within the geofence 116 corresponding to IFS 102 location. For example, the mobile device 106 may broadcast a request for a Bluetooth connection or may start a handshake sequence after being physically connected to an internal wireless network. In other embodiments, data interface 206 of the IFS 102 may send a signal to start a communication and may receive a reply as a signal of the presence of the mobile device 106 and/or vehicle 108.

Account manager 216 may then determine the identity of the user in step 504. To identify the user, account manager 216 may request user's authentication information from either mobile device 106 and/or vehicle 108. The authentication request can include a request for one or more items of information to be input by a user of the mobile device 106. The user may respond to the request by inputting the information on a user interface of the mobile device 106. According to another embodiment, the authentication request can include a request for user's biometric information.

In various embodiments, the biometric information may include finger print data, retinal scan data, face scan data and the like. In one embodiment, first biometric sensor may be incorporated in the user's mobile device 106 and a second biometric sensor may be incorporated in the user's vehicle 108. Accordingly, the first and second biometric sensors may include a fingerprint scanner, a retina scanner, a face scanner, voice biometric device or any other biometric sensor/device known in the art. It is noted that one or more of the second biometric sensors might be attached to "common touch" areas in the vehicle, such as a steering wheel, a gear shift lever, a touch panel, and the like. In some embodiments, biometric information may be provided by one or more wearable devices that automatically retrieve biometric information from a user.

Information associated with the authentication is then forwarded by account manager 216 to the back end system 112. A user identity may be determined from the obtained authentication information by the back end system 112. For example, if a user enters a name or other identifier, the back end system 112 can then search the account information database for the user identity. Various embodiments of the present invention contemplate that biometric information related to primary and/or secondary users may be requested from users when they sign up for the fuel dispensing account being managed by IFS 102.

In response to successful authentication of the user 104, at 506, account manager 216 may determine whether a fuel dispensing request was received from either mobile device 106 and/or the OBD device integrated with the vehicle 108. In some embodiments, removal of the pump handle by user 104 could also serve as a fuel dispensing request. In some embodiments, at this point, account manager 216 may send a notification, as described below in relation to step 512. Once account manager 216 detects a fuel dispensing event associated with a fuel dispensing account (step 506, yes branch), at 508, account manager 216 may exchange additional information with the back end system 112 to determine whether a particular type of transaction requested by user 104 has been pre-approved by one or more primary users. As another non-limiting example, in step 508, account manager 216 may check whether the purchase amount associated with the request does not exceed pre-approved amount.

In response to determining that the transaction request meets all of the pre-approved parameters (step 508, yes branch), at 510, account manager 216 may determine whether a primary user notification feature associated with this particular account is enabled. In other words, account manager 216 may check whether one or more primary users are interested in notifications related to all account activities. If so (step 510, yes branch), at 512, account manager 216 may send a request to notification engine 218 to generate a notification indicative of fuel dispensing transaction and send it to one or more primary users, for example. The notification may be a Short Message Service (SMS) message, instant message, email message, and the like. The notification may include all relevant information, such as a user requesting a transaction (if identified), IFS 102 location, purchase amount and/or fuel type associated with the transaction. In addition, at 514, account manager 216 may enable dispenser 214 to perform the requested transaction.

Figure 3:
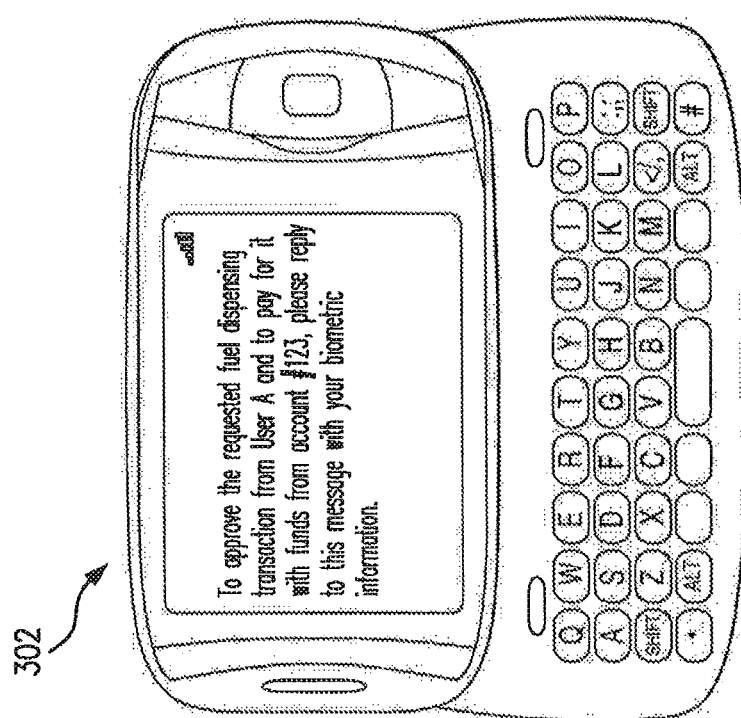
FIG. 3 depicts a device of a primary user receiving an authorization request, according to an embodiment of the present invention.

In response to determining that the transaction request does not meet one or more of the pre-approved parameters (step 508, no branch), at 516, account manager 216 may send an authorization request in real time to one or more primary account holders associated with the fuel dispensing account. Examples of the authorization request are shown in FIGS. 3 and 4 and may include a verbal description of the transaction sent to the primary user's mobile device 302 in a text message, such as SMS text. If the primary user approves of the transaction request, he may transmit an approval back to the account manager 216. The nature of the approval may depend on how the authorization request was transmitted and the primary user's device 302 that receives the authorization request. For example, if the authorization request was sent by notification engine 218 as a voice message to the device 302 such as a phone, then the primary user may reply by entering a predetermined code, which may include one or more entries on the phone keypad of numbers (0-9), symbols (*, #), or combinations of both. In various embodiments, the primary user may also give verbal approval, such as by saying the word "Yes". If the authorization request was sent as a text message to the primary user's device 302, then the primary user may reply by sending a text message back that includes the predetermined code. In some embodiments, if transaction amount exceeds certain threshold, primary users may have to provide their biometric information (as shown in FIG. 3) if their devices 302 are integrated with biometric sensors, such as fingerprint scanners. Thus, a reply with primary users' biometric information may serve as an authorization reply. If the authorization request was sent as a notification to a software application on the user's mobile device 302 (shown in FIG. 4), then the user may reply by selecting a "Yes" or "Authorize" indicator that is part of the software application. It is to be appreciated that there is typically a latency period for receiving transaction approvals. In such scenarios (e.g., during credit card transaction) external entities such as VISA/Mastercard might have time restrictions where approval has to happen within a very narrow window. Thus, in accordance with certain illustrated embodiments, account manager 516 is configured to account for timeout on approvals where it could result in denial of transaction, approval for a pre-configured small amount, etc. Further, it is contemplated capture of additional information from a user and vehicle may be warranted for fraud use purposes.

Next, at 518, account manager 216 may receive and process primary user's response to the authorization in real-time. In response to determining that primary's user reply indicates approval of the pending fuel dispensing transaction (step 520, yes branch), at 514, account manager 216 may enable dispenser 214 to perform the requested transaction. Otherwise (step 520, no branch), account manager 216 may notify the user 104 that the requested transaction is denied by providing a corresponding message on a display or other output device associated with IFS 102 or by sending a message to user's mobile device 106. It is noted that in some embodiments, primary users may have an option to request disablement of vehicle 108 if any security breach occurred. As shown in FIG. 4, at least in those cases where the authorization request was sent to a software application on the user's mobile device 302, the primary users may have an option to select, for example, "Deny and Disable Vehicle" indicator that is part of the software application. If account manager 216 receives such a reply, at 522, account manager 216, in cooperation with security engine 220, may disable vehicle 108 in some fashion by communicating with the OBD integrated with the vehicle 108.

It is noted that current OBD devices typically only provide one-way interaction, (e.g., data is only obtained from an OBD device). This is deliberate to prevent hacking of vehicle telemetry and operating configuration. Thus, the aforesaid "Deny and Disable Vehicle" feature may consist of notifications to agencies such as law enforcement, in-store clerk notification and other desired parties, with the captured vehicle information such as VIN, Year/Make/Model and the like for vehicle tracking purposes. The "Deny and Disable Vehicle" may also include removal of the vehicle from the list of vehicles tied to a fuel account (e.g., estrangement of a family member, exclusion from a fleet service, etc).

In summary, various embodiments of Integrated Fueling Station 102 disclosed herein advantageously enable various options for managing a fuel dispensing account, including various security schemes.

In each of the above discussed embodiments, it is to be understood that the IFS 102 can include local or remote processing for employing the described techniques. That is, the IFS 102 can include local or remote processing circuitry to store, determine, and transmit data to/from the user, the vehicle, the mobile device, etc. It is noted that described functionality of the account manager 216 and notification engine 218 may be implemented remotely to the IFS 102, for example, as a cloud computing service.

Although the systems and methods of the subject invention have been described with respect to the embodiments disclosed above, those skilled in the art will readily appreciate that changes and modifications may be made thereto without departing from the spirit and scope of the subject invention as defined by the appended claims. For instance, the aforesaid illustrated embodiments are applicable to a "shared" vehicle scenario (e.g., Uber) in which one of a plurality of users (e.g., vehicle occupants) may collectively pay for fuel. Thus, authorization can be from a primary holder who might be in the vehicle, or remote from the vehicle, while other vehicle occupants are sharing in the actual payment.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A system, comprising:
a receiver configured for wireless communication with a device;
a memory configured to store instructions;
one or more processors disposed in communication with the memory, wherein the one or more processors upon execution of the instructions are configured to:
receive a fuel request, from a user device associated with a primary user account via the receiver, to dispense requested fuel from a fuel dispensing apparatus;
perform a determination that authorization for the fuel request does not exist from the primary account; and
based on the determination that authorization does not exist from the primary account, instruct the fuel request to be refused by the fuel dispensing apparatus, remove a vehicle from a list of vehicles associated with the primary account, and disable the vehicle.

2. The system of claim 1, wherein the receiver is configured to initiate point-to-point communication with the user device.

3. The system of claim 2, wherein the point-to-point communication consists of at least one of Bluetooth signal, a beacon signal, a barcode, optical and Near Field Communication (NFC) link.

4. The system of claim 1, wherein the receiver is configured to initiate network communication with the user device.

5. The system of claim 4, wherein the user device is one of a smart phone device and a component directly integrated with the vehicle.

6. The system of claim 4, wherein the user device is a wearable computing device.

7. The system of claim 1, wherein vehicle identification is retrieved from the user device.

8. The system of claim 7, wherein the user device is an OBD device coupled to the vehicle and communicates the vehicle identification to the receiver.

9. The system of claim 8, wherein the user device is directly integrated and is not separable from the vehicle.

10. The system of claim 7, wherein the user device is an OBD device coupled to the vehicle and communicates the vehicle identification to a user smart phone device which communicates with the receiver.

11. The system of claim 1, wherein the fuel request to dispense fuel also includes information identifying a user.

12. The system of claim 11, wherein the user identifying information includes biometric information.

13. The system of claim 12, wherein the biometric information is retrieved from a user wearable computing device.

14. A method, comprising:
receiving, from a user device associated with a primary user account, a fuel request to dispense requested fuel, wherein the fuel request is received by a receiver of a fuel dispensing device;
performing a determination that authorization for the fuel request does not exist from the primary account; and
based on the determination that authorization does not exist from the primary account, instructing the fuel request to be refused by the fuel dispensing apparatus, removing a vehicle from a list of vehicles associated with the primary account, and disabling the vehicle.

15. The method of claim 14, wherein the user device is one of a smart phone device and a component directly integrated with the vehicle.

16. The method of claim 15, wherein the user device is a wearable computing device.

\* \* \* \* \*